(12) United States Patent
Park et al.

(10) Patent No.: US 7,899,490 B2
(45) Date of Patent: *Mar. 1, 2011

(54) CALL CONTROL METHOD FOR DUAL-MODE MOBILE TERMINALS AND A DUAL-MODE MOBILE TERMINAL USING THE SAME

(75) Inventors: Jae-Sun Park, Suwon-si (KR); Hong-Gu Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 589 days.

This patent is subject to a terminal disclaimer.

(21) Appl. No.: 11/954,581

(22) Filed: Dec. 12, 2007

(65) Prior Publication Data

US 2008/0090605 A1 Apr. 17, 2008

Related U.S. Application Data

(63) Continuation of application No. 10/929,259, filed on Aug. 30, 2004.

(30) Foreign Application Priority Data

Jan. 14, 2004 (KR) .................. 2662/2004

(51) Int. Cl.
H04M 1/00 (2006.01)
H04M 11/00 (2006.01)
H04W 4/00 (2009.01)
H04W 72/00 (2009.01)

(52) U.S. Cl. ............. 455/552.1; 455/421; 455/432.1; 455/432.2; 455/433; 455/454

(58) Field of Classification Search ............. 455/552.1, 455/421, 432.1, 432.2, 433, 454

See application file for complete search history.

(56) References Cited

U.S. PATENT DOCUMENTS

| | | | | |
|---|---|---|---|---|
| 4,989,230 A * | 1/1991 | Gillig et al. | ............... | 455/552.1 |
| 6,246,673 B1 * | 6/2001 | Tiedemann et al. | ......... | 370/333 |
| 6,393,307 B1 * | 5/2002 | Kim | ........................... | 455/566 |

(Continued)

FOREIGN PATENT DOCUMENTS

CN 1604661 4/2005

(Continued)

*Primary Examiner* — Matthew D Anderson
*Assistant Examiner* — Bobbak Safaipour
(74) *Attorney, Agent, or Firm* — The Farrell Law Firm, P.C.

(57) ABSTRACT

A dual-mode mobile terminal, which can access synchronous and asynchronous mobile communication systems, includes a key input panel and a controller. The key input panel includes a call switching key for switching between calls from the two systems and a call end key for ending calls from the two systems. While the terminal performs communication of one call received from one of the two systems in a general communication mode over a communication channel currently established by the one system, the controller determines whether an incoming call is received from the other system. If the incoming call is received, the controller notifies the user of receipt of the incoming call. If the call switching key is pressed, the controller prepares a communication environment for communication of the incoming call, allowing the user to perform the communication of the incoming call while maintaining the currently established communication channel.

15 Claims, 5 Drawing Sheets

U.S. PATENT DOCUMENTS

| | | | |
|---|---|---|---|
| 6,526,039 B1 * | 2/2003 | Dahlman et al. | 370/350 |
| 6,704,581 B1 * | 3/2004 | Park et al. | 455/553.1 |
| 6,950,419 B1 * | 9/2005 | Park et al. | 370/338 |
| 6,992,999 B2 * | 1/2006 | Park et al. | 370/332 |
| 7,079,841 B2 * | 7/2006 | Park | 455/436 |
| 7,133,384 B2 * | 11/2006 | Park et al. | 370/331 |
| 7,295,536 B2 * | 11/2007 | Refai et al. | 370/331 |
| 2001/0044298 A1 * | 11/2001 | Tuji et al. | 455/421 |
| 2002/0037726 A1 * | 3/2002 | Czaja et al. | 455/442 |
| 2005/0026646 A1 * | 2/2005 | Naim et al. | 455/552.1 |
| 2006/0229114 A2 * | 10/2006 | Kim | 455/575.1 |
| 2006/0268836 A1 * | 11/2006 | Prentice | 370/352 |

FOREIGN PATENT DOCUMENTS

EP     1 104 974     6/2001

* cited by examiner

CALL CONTROL METHOD FOR DUAL-MODE MOBILE TERMINALS AND A DUAL-MODE MOBILE TERMINAL USING THE SAME

PRIORITY

This application is a continuation application of U.S. patent application Ser. No. 10/929,259, filed on Aug. 30, 2004, and claims priority to an application entitled "CALL CONTROL METHOD FOR DUAL-MODE MOBILE TERMINALS AND DUAL-MODE MOBILE TERMINAL USING THE SAME", filed in the Korean Intellectual Property Office on Jan. 14, 2004 and assigned Ser. No. 2004-0002662, the contents of which are incorporated herein by reference.

BACKGROUND OF THE INVENTION

1. Field of the Invention

The present invention relates to a mobile terminal, and more particularly to a dual-mode mobile terminal that supports both synchronous and asynchronous modes.

2. Description of the Related Art

The use of mobile terminals has been rapidly increasing around the world. Mobile communication systems, which provide communication services to the mobile terminals, can be mainly divided into a GSM mobile communication system that is primarily used in Europe and a CDMA mobile communication system that is primarily used in North America. The CDMA mobile communication system employs a synchronous data transmission mode and the GSM mobile communication system employs an asynchronous data transmission mode. The synchronous mode achieves synchronization between a transmitter and a receiver using a GPS satellite signal, whereas the asynchronous mode achieves the synchronization using a special chip or software.

In some areas, both the synchronous CDMA mobile communication system and the asynchronous GSM mobile communication system provide overlapping mobile communication services. In such areas where the CDMA and GSM mobile communication systems are used together, users need to have CDMA terminals if they wish to receive CDMA services or GSM terminals if they wish to receive GSM services. Dual-mode mobile terminals, which can access both the synchronous CDMA and asynchronous GSM mobile communication systems to receive communication services therefrom, are under development to meet this need.

The dual-mode mobile terminal generally operates in one of the synchronous and asynchronous communication modes, and switches between the synchronous and asynchronous communication modes according to user selection.

Another dual-mode mobile terminal, which can access both the synchronous CDMA and asynchronous GSM mobile communication systems and operate in the synchronous and asynchronous communication modes at the same time, is also under development.

Although dual mode terminals are known in the art, there has been suggested no method or technology for controlling calls in the dual-mode mobile terminals, which can operate in the synchronous and asynchronous communication modes simultaneously, when the terminal receives calls from both the CDMA and GSM mobile communication systems at the same time.

SUMMARY OF THE INVENTION

Therefore, it is an object of the present invention to provide a call control method for mobile terminals and a mobile terminal using the method.

In accordance with the present invention, the above and other objects can be accomplished by the provision of a dual-mode mobile terminal capable of accessing a synchronous mobile communication system and an asynchronous mobile communication system, the terminal including a key input unit including a call switching key for switching between a call from the synchronous mobile communication system and a call from the asynchronous mobile communication system and a call end key for ending calls from the mobile communication systems; and a controller for determining, during a communication of one call received from one of the synchronous and asynchronous mobile communication systems in a general communication mode, whether another call is received from the other mobile communication system, and notifying a user of the terminal of the receipt of the other call if it is determined that the other call has been received from the other mobile communication system, and preparing a communication environment for communication of the other call if the call switching key is pressed by the user to allow the user to perform the communication of the other call while maintaining a communication channel that has been established for the communication of the one call.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The preferred embodiments of the present invention will now be described in detail with reference to the annexed drawings. In the following description, a detailed description of known functions and configurations incorporated herein will be omitted when it may make the subject matter of the present invention unclear.

Figure 1:
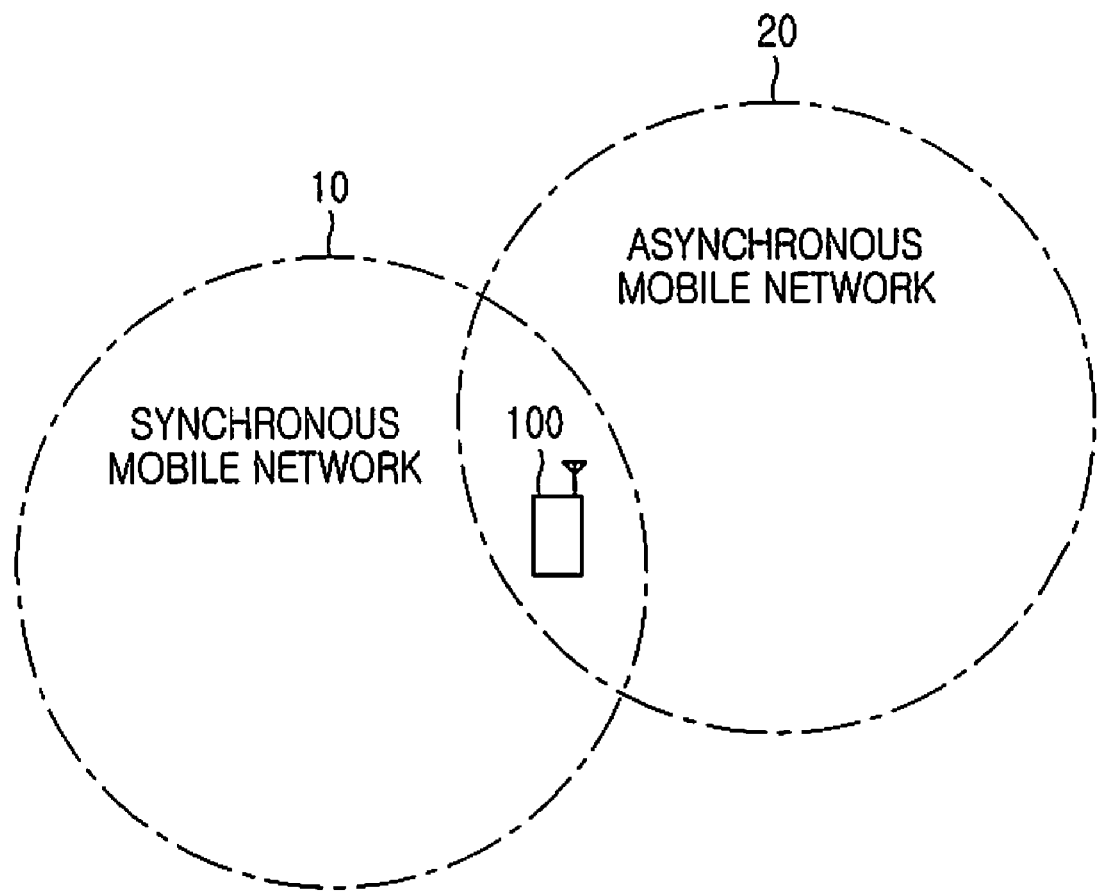
FIG. 1 is a diagram showing service areas of mobile communication systems that can be accessed by a dual-mode mobile terminal according to the present invention.

FIG. 1 is a diagram showing service areas of mobile communication systems that can be accessed by a dual-mode mobile terminal according to the present invention. A dual-mode mobile terminal 100 is positioned in a service area covered by both a synchronous mobile communication system 10 and an asynchronous mobile communication system 20. In the present invention, it is assumed that the dual-mode terminal 100 can simultaneously gain access to synchronous and asynchronous communication systems and receive communication services therefrom. Specifically, the dual-mode terminal 100 can receive calls from the synchronous and asynchronous communication systems 10 and 20. The dual-mode terminal 100 can also receive SMS messages and various other information from the synchronous and asynchronous mobile communication systems 10 and 20 at the same time. The user of the dual-mode terminal 100 can select a desired one of the synchronous and asynchronous communication systems 10 and 20 and transmit a call to the selected system.

In the present invention, while the dual-mode terminal 100 performs the communication of a call received from one of the synchronous CDMA and asynchronous GSM communication systems, if the terminal 100 receives an incoming call from the other system, the terminal 100 notifies the user of the receipt of the incoming call from the other system. When the user is notified of the receipt of the incoming call, the user can then press a call end key or a call switching key. The call end key may be embodied as a call end key for ending a call from the asynchronous mobile communication system and a call end key for ending a call from the synchronous mobile communication system. The call switching key allows the user to suspend current communication of a call received from one of the synchronous and asynchronous communication systems and then to respond to another call received from the other system.

According to the present invention, the dual-mode terminal 100 determines whether the user has pressed the call end key or the call switching key, and then performs an operation corresponding to the pressed key. If a call end key is pressed, the dual-mode terminal 100 ends a call received from a mobile communication system (for example, one of the asynchronous and synchronous mobile communication systems) corresponding to the pressed call end key, and transmits a call end message to the mobile communication system. On the other hand, if the call switching key is pressed, the dual-mode terminal 100 suspends current communication of one call and prepares a communication environment for communication of another call by controlling a speaker and a microphone while maintaining a communication channel that has been established for the current communication. The configuration of such a dual-mode terminal will now be described with reference to FIG. 2.

Figure 2:
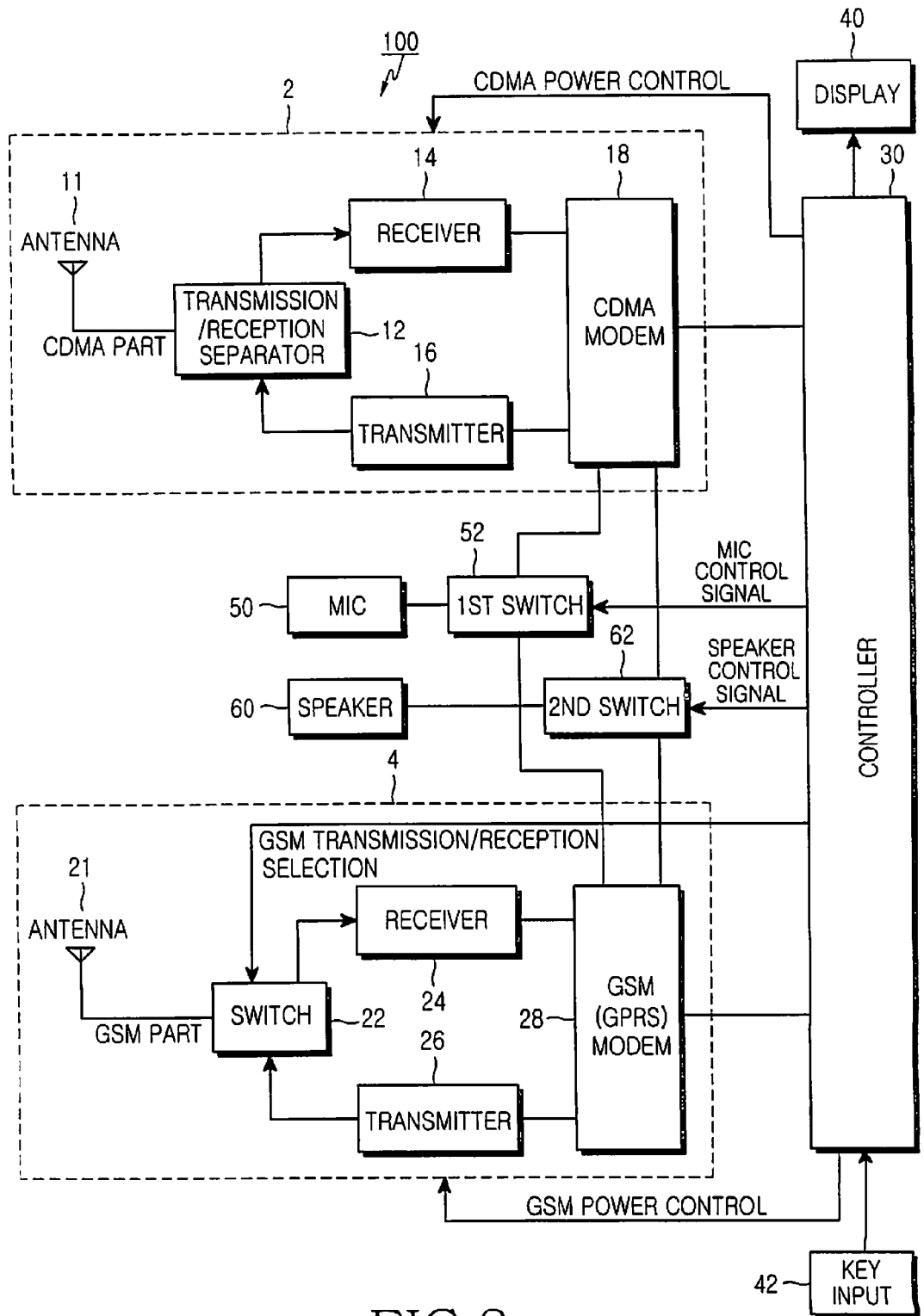
FIG. 2 is a block diagram showing the configuration of a dual-mode mobile terminal according to an embodiment of the present invention.

As shown in FIG. 2, the dual-mode terminal 100 includes a synchronous CDMA module 2, an asynchronous GSM module 4, a controller 30, a display unit 40 and a key input unit 42. The dual-mode terminal 100 further includes a microphone 50, a speaker 60 and first and second switches 52 and 62 connected respectively to the microphone 50 and the speaker 60. The first and second switches 52 and 62 respectively, are controlled by control signals from the controller 30.

The controller 30 controls the overall operation of the synchronous CDMA module 2 and the asynchronous GSM module 4. The synchronous CDMA module 2 includes a CDMA antenna 11, a transmission/reception separator 12, a receiver 14, a transmitter 16 and a CDMA modem 18. The CDMA antenna 11 is used to transmit and receive radio signals to and from the synchronous CDMA mobile communication network 10 (FIG. 1), and is designed to be sensitive to frequencies used in the CDMA mobile communication network. If a radio signal is received from the CDMA mobile communication network 10 through the CDMA antenna 11, the received signal is input to the transmission/reception separator 12 in the CDMA module 2. The transmission/reception separator 12 in the CDMA module 2 outputs the received signal from the CDMA antenna 11 to the receiver 14. When the transmission/reception separator 12 receives a transmission signal from the CDMA modem 18 via the transmitter 16, the separator 12 outputs the transmission signal to the CDMA antenna 11. The transmitter 16 modulates data output from the CDMA modem 18, and transmits an RF signal carrying the modulated data through the transmission/reception separator 12 and the CDMA antenna 11. The receiver 14 receives a radio signal through the CDMA antenna 11 via the transmission/reception separator 12 and converts the received signal into an intermediate frequency (IF) signal and demodulates it into data, and then outputs it to the CDMA modem 18. The CDMA modem 18 modulates an audio signal received through the microphone 50 via a first switch 52 into a radio signal, and demodulates a radio signal received through the receiver 14 into an audio signal and outputs it via a second switch 62 through the speaker 60.

The asynchronous GSM module 4 includes a GSM antenna 21, a switch 22, a receiver 24, a transmitter 26 and a GSM modem 28. The GSM antenna 21 is used to transmit and receive radio signals to and from the asynchronous GSM mobile communication network 20 (FIG. 2), and is designed to be sensitive to frequencies used in the GSM mobile communication network. If a radio signal is received from the GSM mobile communication network 20 through the GSM antenna 21, the received signal is input to the switch 22 in the GSM module 4. The switch 22 in the GSM module 4 outputs the received signal from the GSM antenna 21 to the receiver 24. When the switch 22 receives a transmission signal from the GSM modem 28 via the transmitter 26, the switch 22 outputs the transmission signal to the GSM antenna 21. The GSM system uses a Time Division Duplex (TDD) scheme, such that channels assigned to uplink and downlink are spaced apart from each other by specified time intervals. In the GSM system, a terminal and a base station perform transmission and reception in intervals of time slots so that transmission and reception are not performed in the terminal at the same time.

That is, the GSM terminal deactivates its receiver during transmission and deactivates its transmitter during reception. The switch 22 connects an output of the transmitter 26 to the GSM antenna 21 during transmission under the control of the controller 30. On the other hand, the switch 22 connects the GSM antenna 21 to an input of the receiver 24 during reception under the control of the controller 30.

The transmitter 26 modulates data output from the GSM modem 28 and transmits an RF signal carrying the modulated data through the switch 22 and the GSM antenna 21. The receiver 24 receives a radio signal through the GSM antenna 21 via the switch 22, and converts the received signal into an intermediate frequency signal and demodulates it into data, and then outputs it to the GSM modem 28. The GSM modem 28 modulates an audio signal received through the microphone 50 via a first switch 52 into a radio signal, and demodulates a radio signal received through the receiver 24 into an audio signal and outputs it via a second switch 62 through the speaker 60.

The display unit 40 generally includes a Liquid Crystal Display (LCD) to display various messages, icons and the like under the control of the controller 30. The key input unit 42 includes various keys including number keys to provide key input data corresponding to a key entered by the user to the controller 30. According to the present invention, the key input unit 42 may further include a call switching key, a call end key for ending a call received from the asynchronous mobile communication system and a call end key for ending a call received from the synchronous mobile communication system. The CDMA antenna 11 and the GSM antenna 21 may also be embodied as a single antenna.

The controller 30 is connected to the synchronous CDMA module 2 and the asynchronous GSM module 4 to control the overall operation of the two modules 2 and 4. Specifically, the controller 30 allows radio signals to be received and transmitted through the synchronous CDMA module 2 and the asynchronous GSM module 4.

Figure 3A:
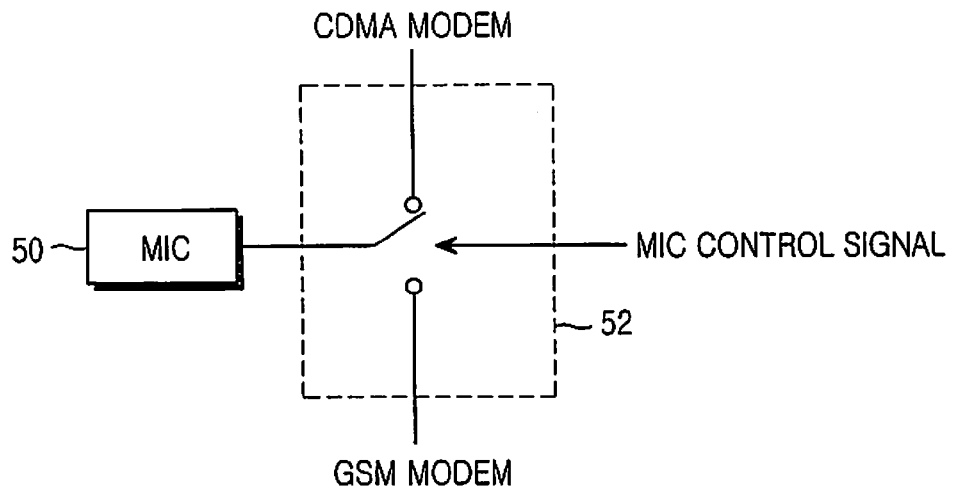
FIGS. 3A and 3B are diagrams showing in detail the configuration of first and second switches provided in the dual-mode mobile terminal of FIG. 2, respectively.
Figure 3B:
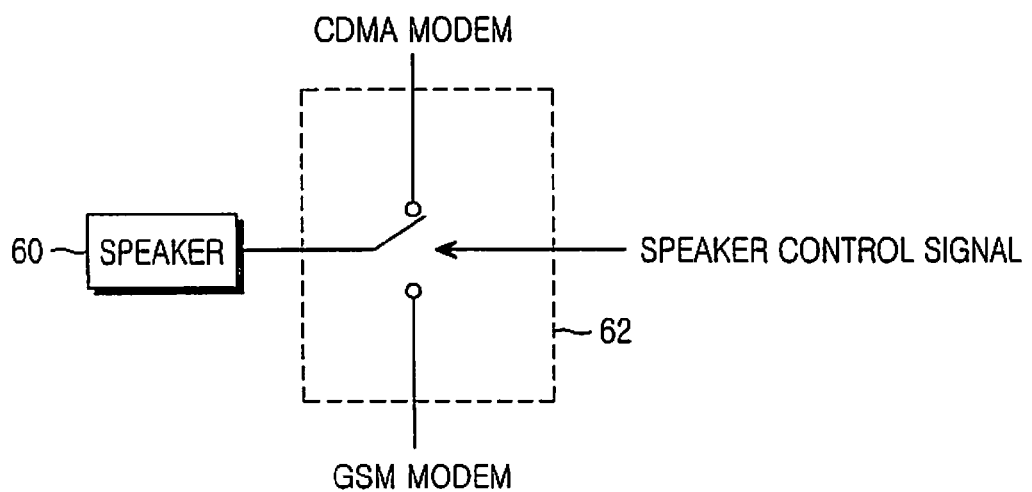

When a call is received through the synchronous CDMA module 2 or the asynchronous GSM module 4, the controller informs the user of the receipt of the call. If the user responds to the received call, the controller 30 controls the first and second switches 52 and 62 connected respectively to the microphone 50 and the speaker 60 so that the microphone 50 and the speaker 60 are connected to the synchronous CDMA module 2 or to the asynchronous GSM module 4 through which the call is received. Specifically, as shown in FIG. 3A, the controller 30 applies a microphone control signal to the first switch 52 so that the microphone 50 is connected to one of the CDMA and GSM modems 18 and 28. In addition, as shown in FIG. 3B, the controller 30 applies a speaker control signal to the second switch 62 so that the speaker 60 is connected to one of the CDMA and GSM modems 18 and 28, respectively.

While the user performs a communication via one of the synchronous and asynchronous mobile communication systems with which the terminal 100 has been connected through a corresponding one of the synchronous CDMA module 2 and the asynchronous GSM module 4, if the terminal 100 receives an incoming call from the other mobile communication system, the controller 30 notifies the user of the receipt of the incoming call therefrom. For this notification, the controller 30 may display a predetermined message or icon on the display unit 40 or output an alert or alarm sound. The controller 30 then determines whether the call end key or the call switching key is pressed by the user. If the call end key is pressed, the controller 30 ends a call received from one of the synchronous and asynchronous mobile communication systems corresponding to the pressed call end key, and transmits a call end message to that particular mobile communication system. The controller 30 then controls the first and second switches 52 and 62 so that the microphone 50 and the speaker 60 are connected to one of the CDMA and GSM modems 18 and 28 corresponding to the other of the synchronous and asynchronous mobile communication systems, a call from which has been maintained, thereby allowing the user to perform communication of the call that has been maintained.

On the other hand, if the call switching key is pressed, the controller 30 controls the first and second switches 52 and 62 so that the speaker 50 and the microphone 60, which have been connected to one of the CDMA and GSM modems 18 and 28 for current communication of a call received through the one modem, are connected to the other modem to allow the user to perform communication of another call received through the other modem while maintaining a communication channel established for the current communication.

A description will now be given of how call control is performed in the dual-mode mobile terminal with reference to FIG. 4.

Figure 4:
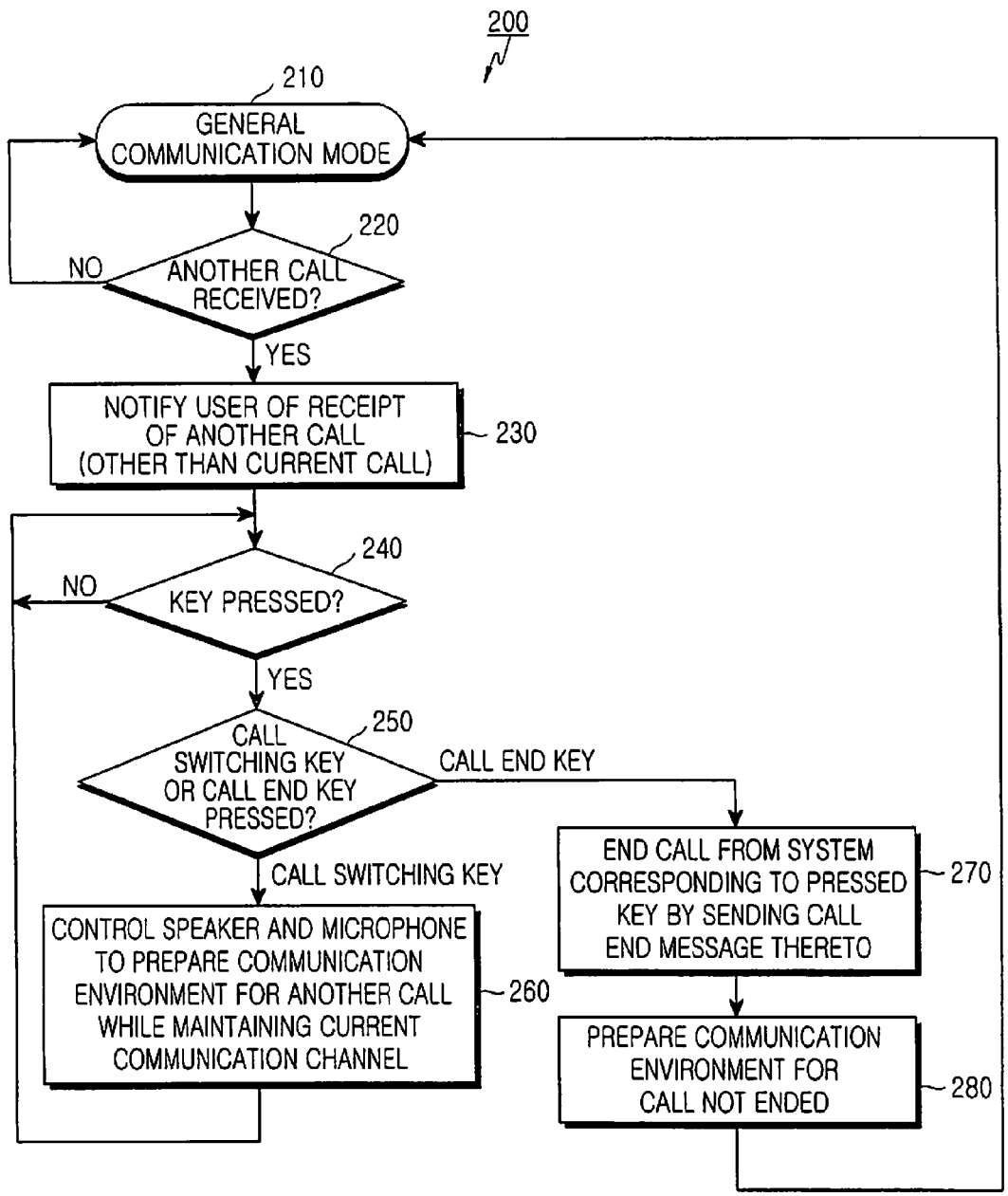
FIG. 4 is a control flow diagram showing how call control is performed in the dual-mode terminal according to an embodiment of the present invention.
Figure 5:
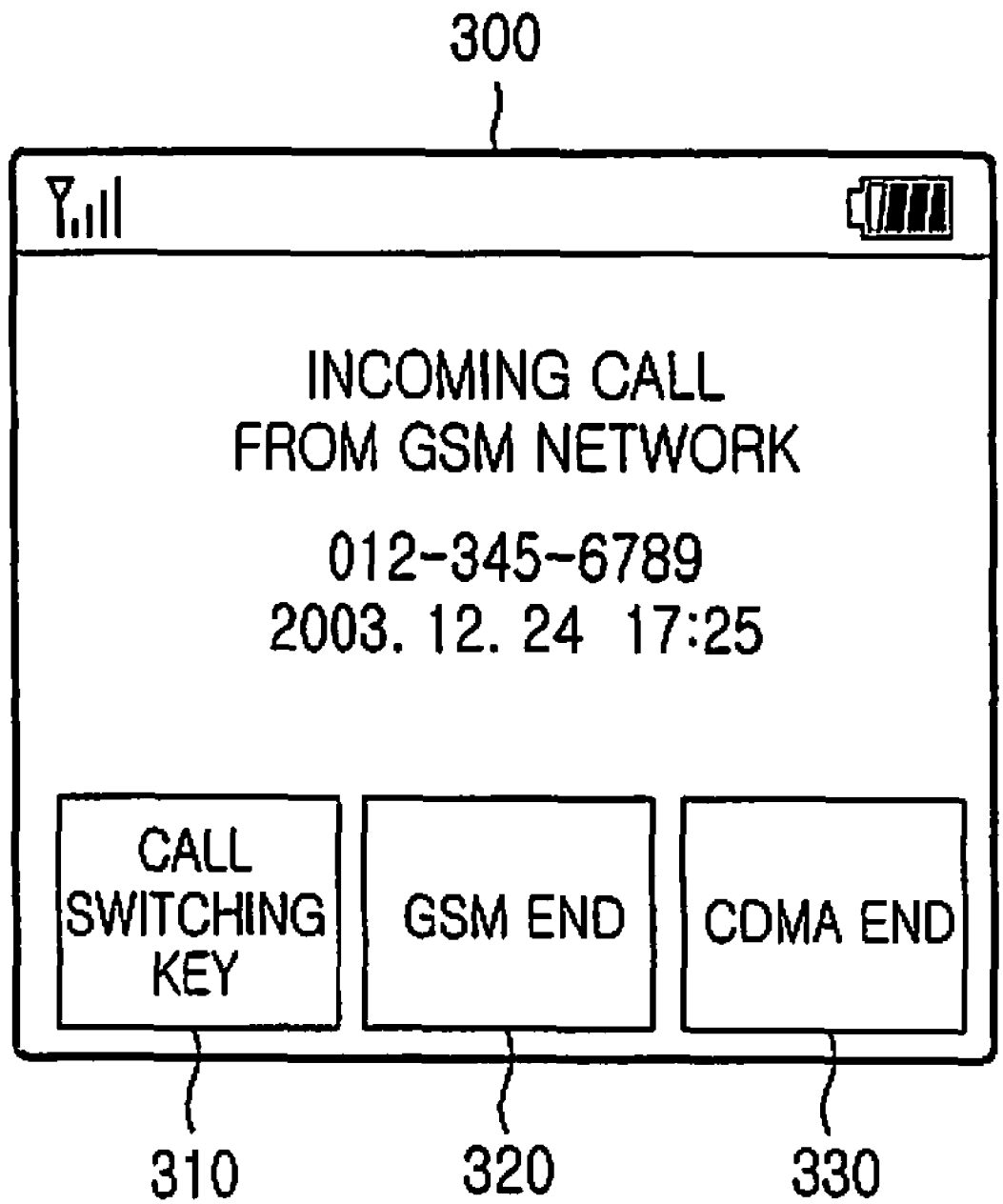
FIG. 5 is an example of a screen of a display unit when call control is performed in the dual-mode terminal according to the present invention.

As shown in FIG. 4, the controller 30 in the dual-mode terminal is in a general communication mode at step 210, in which the dual-mode terminal performs a general communication function in response to an incoming call from one of the synchronous and asynchronous mobile communication systems. While the dual-mode terminal performs current communication of the call received from one mobile communication system in the general communication mode, the controller 30 determines at step 220 whether an incoming call is received from the other communication system (i.e., a mobile communication system other than the one mobile communication system with which the current communication has been established). If no incoming call is received from the other mobile communication system, the controller 30 allows the terminal to operate in the general communication mode. On the other hand, if an incoming call is received from the other mobile communication system, the controller 30 moves to step 230 to notify the user of the receipt of the incoming call from the other mobile communication system. For example, the controller 30 notifies the user of the receipt of the different call via a message as shown in FIG. 5. In other words, the controller 30 displays the message as shown in FIG. 5 indicating the receipt of the incoming call from the other mobile communication. Here, the controller 30 may also display a calling telephone number and a received time of the incoming call, together with the message indicating the receipt of the incoming call.

The controller 30 then determines at step 240 whether the user has pressed a key on the key input unit 42. If the user has pressed a key, the controller 30 moves to step 250 to determine whether the pressed key is a call switching key or a call end key. As shown in FIG. 5, the controller 30 provides, for example, three key options (i.e., a call switching key 310, a key 320 for ending a call received from the asynchronous GSM mobile communication system and a key 330 for ending a call received from the synchronous CDMA mobile communication system) to the user so that the user selects a desired key from the three keys 310, 320 and 330. The user selects the call switching key 310 in order to perform a communication while maintaining a call from the synchronous mobile communication system and a call from the asynchronous mobile communication system. On the other hand, the user selects one of the two call end keys 320 and 330 in order to end one of the calls from the synchronous and asynchronous mobile communication systems and then perform communication in a general communication mode. In the example of FIG. 5, the two keys 320 and 330 are provided to end the calls from the synchronous and asynchronous mobile communication systems, respectively. Alternatively, only one call end key may be provided to end a call from either of the two mobile communication systems. In this case, if the user has pressed the call end key, the controller 30 may control the first and second switches 52 and 62 to terminate current communication performed through one of the CDMA and GSM modems 18 and 28, to which the microphone 50 and the speaker 60 have been connected by the first and second switches 52 and 62.

Referring to FIG. 4, if the user has pressed a call end key, the controller 30 moves to step 270 to end a call from a mobile communication system (for example, one of the asynchronous and synchronous mobile communication systems) corresponding to the pressed call end key by transmitting a call end message to that mobile communication system. The controller 30 then moves to step 280 to prepare a communication environment for communication of the call that has not been ended. That is, the controller 30 controls the first and second switches 52 and 62 so that the microphone 50 and the speaker 60 are connected to a modem for one of the two mobile communication systems, a call from which has been maintained, thereby allowing the user to perform communication for the call. The controller 30 then returns to step 210 to enter the general communication mode.

If the call switching key has been pressed, the controller 30 moves to step 260 to control the first and second switches 52 and 62 so that the speaker 50 and the microphone 60, which have been connected to one of the CDMA and GSM modems 18 and 28 for the current communication of a call received through the one modem, are connected to the other modem while maintaining the communication channel established for the current communication. This allows the user to perform communication of another call received through the other modem while maintaining the communication channel established for the current communication. The controller 30 then returns to step 240.

As apparent from the above description, the present invention provides a call control method for dual-mode mobile terminals and a dual-mode mobile terminal using the method, whereby the user can receive both a call from a synchronous mobile communication system and a call from an asynchronous mobile communication system, and even when two incoming calls are received simultaneously from two different mobile communication systems, the user can perform communication in response to the two incoming calls.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. A dual-mode mobile terminal capable of simultaneously accessing communication systems using different types of networks, the terminal comprising:
   a key input unit including a key which is used for switching between a first call from a first mobile communication system and a second call from a second mobile communication system;
   a controller for determining, whether the second call is received from the second mobile communication system while the first call of the first mobile communication system is currently connected, notifying a user of the terminal of the reception of the second call from the second mobile communication system when it is determined that the second call has been received from the second mobile communication system, and enabling a communication environment to perform communication of the received second call while maintaining the first mobile communication channel that is currently connected when the key is pressed by the user;
   a first modem for the first mobile communication system;
   a second modem for the second mobile communication system;
   a first switch connected to a microphone for switching the microphone between the first and second modems; and
   a second switch connected to a speaker for switching the speaker between the first and second modems, wherein the controller controls the first and second switches so that the microphone and the speaker are connected to one of the first and second modems corresponding to one of the mobile communication systems.

2. The terminal as claimed in claim 1, wherein the first mobile communication system includes an asynchronous mobile communication system, and the second mobile communication system includes a synchronous mobile communication system.

3. The terminal as claimed in claim 1, wherein the first mobile communication system includes a synchronous mobile communication system, and the second mobile communication system includes an asynchronous mobile communication system.

4. The terminal as claimed in claim 2, wherein the key input unit further comprises:
   a call end key for ending the second call from the second mobile communication system, wherein when the first call from the first mobile communication system is on hold and the call end keys is pressed, the controller ends the second call from the second mobile communication system and prepares a communication environment for the first mobile communication system of the first call which is on hold.

5. The terminal as claimed in claim 4, wherein when the call of each mobile communication system ends by an input of the call end key, an end message is sent.

6. The terminal as claimed in claim 1, wherein the controller displays a message indicating that the second call been received on a display unit while the first call of the first mobile communication system is currently connected, thereby notifying the user of reception of the second call.

7. The terminal as claimed in claim 1, wherein when receiving the second call from the second communication network while the terminal is currently in communication with the first communication network, the controller notifies the reception of the second call by an alert or an alarm sound.

8. A dual-mode mobile terminal capable of simultaneously accessing communication systems using different types of networks, the terminal comprising:
   a key input unit including a key which is used for switching between a first call from a first mobile communication system and a second call from a second mobile communication system;
   a first modem for the first mobile communication system;
   a second modem for the second mobile communication system;
   a first switch connected to a microphone for switching the microphone between the first and second modems;
   a second switch connected to a speaker for switching the speaker between the first and second modems;
   a controller for determining, whether the second call is received from the second mobile communication system while the first call of the first mobile communication system is currently connected, notifying a user of the terminal of the reception of the second call from the second mobile communication system when it is determined that the second call has been received from the second mobile communication system, and controlling the first and second switches so that the user performs communication with the received second call while maintaining a communication channel that is currently connected when the key is pressed by the user;
   a first antenna for receiving a first signal from the first mobile communication system; and
   a second antenna for receiving a second signal from the second mobile communication system.

9. A method for processing a call in a dual-mode mobile terminal which can simultaneously access mobile communication systems using different types of networks, and has a key for switching between a first call from a first mobile communication system and a second call from a second mobile communication system, the method comprising the steps of:

determining whether the second call is received from the second mobile communication system while the first call of the first mobile communication system is currently connected;

notifying a user of the terminal of the reception of the second call from the second mobile communication system when it is determined that the second call has been received from the second mobile communication system;

enabling the user to perform communication of the received second call while maintaining a communication channel that is currently connected when the key is pressed by the user, or ending communication when a call end key is pressed by the user;

switching a first switch and a second switch according to an input of the call end key and the key, the first switch being connected to a microphone for switching the microphone between a first modem for the asynchronous mobile communication and a second modem for the synchronous mobile communication, the second switch being connected to a speaker for switching the speaker between the first modem for the asynchronous mobile communication and the second modem for the synchronous mobile communication; and controlling the first and second switches so that the microphone and the speaker are connected to one of the first and second modems corresponding to one of the mobile communication systems.

10. The method as claimed in claim 9, wherein the first mobile communication system includes an asynchronous mobile communication system, and the second mobile communication system includes a synchronous mobile communication system.

11. The method as claimed in claim 9, further comprising a step of sending an end message when the call of the mobile communication systems ends according to an input of the call end key.

12. The method as claimed in claim 10, further comprising the steps of:

determining whether a call end key for ending a second call from the synchronous mobile communication system is inputted from a key input unit or a call end key for ending a first call from the asynchronous mobile communication system is inputted from the key input unit; and when any one of the call end keys is pressed, ending the current call of a mobile communication system corresponding to the pressed call end key, and preparing a communication environment for a hold call which still connected.

13. The method as claimed in claim 9, wherein the controller displays a message indicating that the received second call has been received on a display unit, thereby notifying the user of reception of the second call.

14. The method as claimed in claim 9, wherein when receiving the second call from the second communication network while the terminal is currently in communication with the first communication network, the controller notifies the reception of the second call by an alert or an alarm sound.

15. A method for processing a call in a dual-mode mobile terminal which can simultaneously access mobile communication systems using different types of networks, the method comprising the steps of:

determining, whether there is a second signal received through a second antenna which receives a second signal of a second mobile communication system while a first signal of a first mobile communication system being currently in communication connection through a first antenna;

notifying a user of the terminal of reception of a second call from the second mobile communication system when the second call from the second mobile communication system has been received;

receiving, from the user, either a key for switching between a first call from the first mobile communication system and the second call from the second mobile communication system, or an end key for ending the either calls; and when the key is pressed by the user, switching a first switch and a second switch, the first switch being connected to a microphone for switching the microphone between a first modem for communication with the first mobile communication system and a second modem for communication with the second mobile communication system, and the second switch being connected to a speaker for switching the speaker between the first modem and the second modem, so that the user performs communication with the second call of the second mobile communication system while maintaining a communication channel that is currently connected via the first mobile communication system.

* * * * *